(12) United States Patent
Schmidt

(10) Patent No.: US 8,260,884 B2
(45) Date of Patent: Sep. 4, 2012

(54) ADDRESS ALLOCATION FOR SECURE BUS SUBSCRIBERS

(75) Inventor: Joachim Schmidt, Horn-Bad Meinberg (DE)

(73) Assignee: Phoenix Contact GmbH & Co. KG (DE)

( * ) Notice: Subject to any disclaimer, the term of this patent is extended or adjusted under 35 U.S.C. 154(b) by 63 days.

(21) Appl. No.: 11/911,963

(22) PCT Filed: Apr. 27, 2006

(86) PCT No.: PCT/EP2006/003922
§ 371 (c)(1),
(2), (4) Date: Mar. 20, 2009

(87) PCT Pub. No.: WO2006/114314
PCT Pub. Date: Nov. 2, 2006

(65) Prior Publication Data
US 2009/0235124 A1  Sep. 17, 2009

(30) Foreign Application Priority Data

Apr. 27, 2005 (DE) .......................... 10 2005 019 970

(51) Int. Cl.
*G06F 15/177* (2006.01)
(52) U.S. Cl. ..................... 709/220; 710/104; 710/107.4; 714/48
(58) Field of Classification Search .................. 709/220; 710/107, 4
See application file for complete search history.

(56) References Cited

U.S. PATENT DOCUMENTS

| 2002/0083246 A1* | 6/2002 | Rupp et al. ..................... 710/107 |
| 2002/0138668 A1* | 9/2002 | Heckel ............................... 710/4 |
| 2003/0097511 A1* | 5/2003 | Choi et al. ..................... 710/305 |

OTHER PUBLICATIONS

Bin Wu, "Chinese Office Action for Application No. 2006800143136", Dated: Jan. 8, 2010, Publisher: Chinese Patent Office, Published in: CN.
Yolaine Cussac, "International Preliminary Examination Report", dated Mar. 27, 2008.
Poeschmann A et al., "Autoconfiguration Management Fuer Feldbusse-Profibus Plug & Play", Elektrotechnik und informationstechnik, Springer Verlag, Wien, AT, vol. 117, No. 5, May 2000, pp. 335-339, XP001077985, ISSN: 0932-383X, p. 336, paragraph 2.-p. 338, paragraph 4.
"Japanese Office Action for Japanese International Application No. 2008-508159 dated Sep. 15, 2010", Publisher: Japanese Patent Office, Published in: Japan.

* cited by examiner

*Primary Examiner* — Kyung H Shin
(74) *Attorney, Agent, or Firm* — Kaplan Breyer Schwarz & Ottesen LLP

(57) ABSTRACT

To configure a secure bus subscriber connected to a field bus in a secure control system, the secure bus subscriber being assigned a defined subscriber address, the invention provides a method having the following steps:
  an address allocation message is sent from a control unit connected to the field bus to the secure bus subscriber, the address allocation message comprising the defined subscriber address,
  the defined subscriber address is stored in a memory in the secure bus subscriber, and
  an acknowledgement message is sent from the secure bus subscriber to the control unit, the acknowledgement message comprising the defined subscriber address, where the address allocation message is sent on the basis of planning data for the secure bus subscriber connected to the field bus which are stored in the control unit.
The invention also provides an appropriate control system.

20 Claims, 2 Drawing Sheets

ADDRESS ALLOCATION FOR SECURE BUS SUBSCRIBERS

Figure 1:
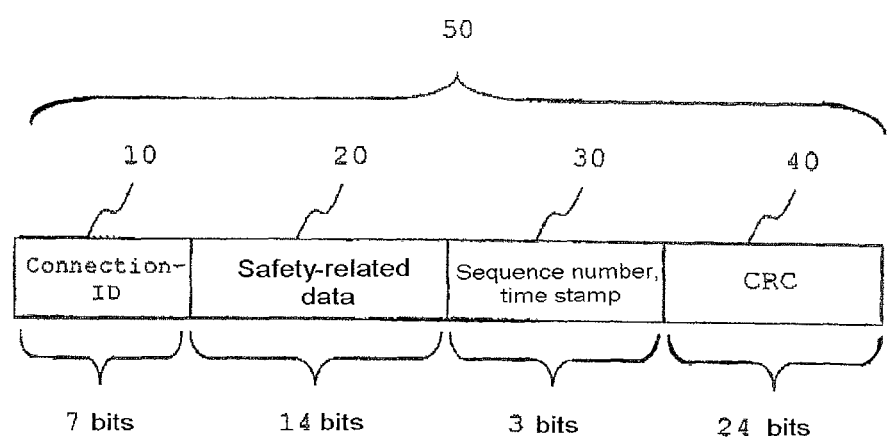

The invention relates generally to automation systems in industry, and particularly to control systems, which comprise at least one bus system with bus subscribers, in particular secure bus subscribers, connected thereto and a central control device, and also to methods for operation thereof.

Today, control and data transmission installations adopt a prominent position in industrial production and installation control on account of the high level of automation they allow. Very widespread use is made of a bus system which connects a multiplicity of local input and output units to a central control device.

To observe safety standards, automation engineering predominantly uses field bus systems, such as CAN bus, Profibus or INTERBUS, in conjunction with safety-oriented bus components. The bus components connected to the field bus are subsequently also referred to as bus subscribers.

It is known practice to increase safety by assigning a bus subscriber an individual subscriber address which can be set directly on the bus subscriber, for example.

EP 1 206 868 B1 also discloses a method for configuring a secure bus subscriber and also a control system which has a bus subscriber of this kind. In the case of the method described in EP 1 206 868 B1, a management unit for allocating subscriber addresses is provided which is connected to the bus. For the management unit, a special maintenance mode is provided in which maintenance telegrams are sent via the bus. Upon receiving a maintenance telegram of this kind, a secure bus subscriber sends a registration telegram comprising a stipulated universal address to the management unit. When the management unit in turn receives such a registration telegram containing a universal address, it returns an address allocation telegram with a defined subscriber address to the secure bus subscriber, where said subscriber address is stored.

A drawback of the method described in EP 1 206 868 B1 is the need for a special maintenance mode and also the large number of telegrams to be interchanged in order to assign the secure bus subscriber a subscriber address. Another drawback is that to assign a subscriber address which is used for later communication, the bus subscriber must already store addressing, referred to as the universal address in EP 1 206 868 B1.

DE 199 34 514 C1 discloses a method for configuring a bus subscriber connected to a field bus which provides for transmission of a logical and a physical address to a bus subscriber from an address allocation unit. The transmitted physical address is verified using an actual physical position for the bus subscriber, and the logical address is stored in a memory in the bus subscriber on the basis of the verification.

A drawback of this method is that the bus subscriber requires information about its actual physical position in the bus.

The invention is therefore based on the object of demonstrating a design-based approach to a solution to how a bus subscriber, particularly a secure bus subscriber, connected to a bus system can be configured and assigned, in particular, a defined subscriber address without the described drawbacks from the prior art.

The object is achieved in surprisingly simple fashion by a subject matter in accordance with one of the attached independent claims. Advantageous embodiments and developments are outlined in the subclaims.

Accordingly, the inventive method for configuring a secure bus subscriber connected to a field bus in a secure control system in order to assign the secure bus subscriber a defined subscriber address comprises the following steps:

an address allocation message is sent from a control unit connected to the field bus to the secure bus subscriber, the address allocation message comprising the defined subscriber address, the defined subscriber address is stored in a memory in the secure bus subscriber, and an acknowledgement message is sent from the secure bus subscriber to the control unit, the acknowledgement message comprising the defined subscriber address, where the address allocation message is sent on the basis of planning data for the secure bus subscriber connected to the field bus which are stored in the control unit.

The invention also covers a method having the following steps:

the subscriber address is defined within a control unit connected to the field bus on the basis of the physical position of the secure bus subscriber within the field bus, an address allocation message is sent from the control unit to the secure bus subscriber, the address allocation message comprising the defined subscriber address, the defined subscriber address is stored in a memory in the secure bus subscriber, and an acknowledgement message is sent from the secure bus subscriber to the control unit, the acknowledgement message comprising the defined subscriber address.

Preferably, the step of defining the subscriber address here comprises the step of storing planning data for the secure bus subscriber connected to the field bus in the control unit, the stored planning data comprising a link between the physical position of the secure bus subscriber within the field bus and the defined subscriber address.

The inventive method can be implemented particularly advantageously in a ring bus system, where the physical position of the secure bus subscriber is defined by the latter's position within the order of the bus subscribers connected to the ring bus.

The inventive method advantageously does not require a management unit or a special maintenance mode and accordingly does not require any special maintenance telegrams either. The resultant additional bus loading therefore does not arise in the case of the inventive method.

In addition, the inventive method does not require any setting of the physical position on the secure bus subscriber and accordingly also does not require a position finding unit on the bus subscriber for the purpose of ascertaining its physical position.

In order to assign the secure bus subscriber a defined subscriber address, the inventive method therefore does not require any already existing addressing information on the part of the secure bus subscriber, as is the case with the prior art described at the outset. Within the context of the method described in EP 1 206 868 B1, the bus subscriber needs to have a stipulated universal address which it transmits to a management unit using a registration telegram.

This universal address allows the communication which is used to transmit the subscriber address to the bus subscriber, which subscriber address is then used for further communication. The inventive method dispenses with this and instead allows the communication for transmitting the subscriber address by virtue of the physical position of the secure bus subscriber within the field bus to which the subscriber address is to be transmitted being known within the control unit. For this purpose, planning data for the secure bus subscriber connected to the field bus are preferably stored in the control unit, said planning data comprising a link between the physical position of the secure bus subscriber and the defined subscriber address.

Within the context of the method described in DE 199 34 514 C1, the bus subscriber needs to have the information regarding its physical position within the bus system in order to allow receipt of a logical address through verification of a concomitantly transmitted physical address using the physical position which is known to the bus subscriber. Such verification by the bus subscriber is not necessary on the basis of the inventive method. Instead, the invention preferably involves the performance of verification by the control unit by virtue of an acknowledgement message being sent from the secure bus subscriber to the control unit, the acknowledgement message comprising the subscriber address assigned to the bus subscriber.

As already mentioned above, automation systems with ring-shaped bus systems, particularly on the basis of the INTERBUS standard, are particularly suitable for carrying out the inventive method.

The INTERBUS works in the manner of a shift register in which the bus subscribers are connected to one another in a ring shape and form the individual storage locations in the shift register. This shift register structure means that the INTERBUS does not require any subscriber addresses in the conventional sense.

The INTERBUS master, which clocks the data through the shift register ring, is normally connected to a control unit. In this case, the control unit may contain a non-secure and a secure controller.

The bus subscribers are normally input/output units which provide non-secure and/or secure inputs/outputs.

If the secure controller needs to communicate with a secure bus subscriber, the secure bus subscribers are addressed using the non-secure INTERBUS protocol. In order to meet the safety requirements for transmitting safety-related data, the safety-related data need to be extended by data which allow recognition of all systematic and random errors during the transmission via the non-secure INTERBUS. These data are calculated and evaluated on the INTERBUS master by the safety communication layer master (SCLM) and on the bus subscribers by the safety communication layer slave (SCLS). The safety-related data and the protection data together produce the secure messages which are transmitted by the non-secure INTERBUS protocol like normal process data.

By way of example, the protection data used may be checksums such as a CRC, time stamp or serial numbers. In one preferred embodiment of a secure INTERBUS protocol, a CRC24 checksum, a serial number comprising 3 bits and a subscriber address referred to as Connection ID, which preferably comprises 7 bits, are used.

The task of the Connection ID is to recognize addressing errors in the non-secure INTERBUS, e.g. by feeding additional clock cycles into the shift register. The SCLM generates a separate Connection ID for each connected secure bus subscriber in the order of the planned bus design.

Preferably, all secure messages which are interchanged between the SCLM and the SCLS on the bus subscribers contain the respective Connection ID. This is protected concomitantly by the CRC24. The SCLM and the SCLS on the bus subscribers check the Connection ID in each received telegram and are therefore able to recognize addressing errors in the non-secure INTERBUS protocol.

The secure communication links start up as follows:

In the initial state, the non-secure INTERBUS may already have started up and non-secure data may already be being transmitted.

As soon as the secure controller with the SCLM has started up, the SCLM transmits connection termination messages (Abort_Connection messages) to all planned secure bus subscribers. This is done regardless of whether the secure bus subscribers are present, have started up or how they react to this message. The connection to a secure bus subscriber leaves this state (Connection_Aborted) by virtue of the device which controls the SCLM (SRC, Safety-Related Controller) sending an initialization request for this connection to the SCLM. The SCLM then transmits an address allocation message or a parameter message with the parameter "Connection ID" to the secure bus subscriber.

As soon as the secure bus subscriber with its SCLS has started up, the SCLS transmits error messages (Safety Slave Error messages) to the SCLM. This is done regardless of whether a secure controller is present, whether the SCLM has started up or how the SCLM reacts to this message, unless the SCLS receives an address allocation message or a secure parameter message with the parameter "Connection ID" from the SCLM.

As soon as the secure controller and the secure bus subscribers have started up and the controller in the SCLM issues the order to set up a communication link (Initiate_Request), the SCLM transmits secure parameter messages to the SCLS in the bus subscriber. The SCLS returns the received parameter to the SCLM using a message of the same type in order to acknowledge receipt. Special maintenance telegrams are not required. In this context, the first transmitted parameter is the Connection ID. The SCLS receives and acknowledges them. The messages used for this contain the Connection ID as a parameter value therefore.

Further parameters are transmitted only if transmission of the Connection ID has been successful. All secure messages transmitted further between the SCLM and the SCLS contain the Connection ID. When the SCLM or the SCLS receives a secure message, the Connection ID, the CRC checksum and the serial number are checked. If an erroneous Connection ID occurs, all secure connections in the bus system are cleared down.

In the further course of events, the SCLM reads parameters from the SCLS which, by way of example, include the appliance type, the manufacturer, the serial number etc. These data verify that the secure subscriber is the planned appliance type at the planned installation location.

If this is the case then the secure communication link is now deemed to have been set up. The transmission and checking of the Connection ID now guarantee that the correct secure bus subscriber is always used for communication.

In the further course of events, appliance parameters such as turn-off times or filter times can be transmitted. The number of appliance parameters is dependent on the appliance type. Once the parameterization is concluded, the secure process data are transmitted.

An inventive control system for the secure control of safety-critical processes which is particularly suitable for carrying out the method described above comprises a bus system, a control device which is connected to the bus system and which has means for generating and sending an address allocation message on the basis of stored planning data, and at least one secure bus subscriber which is connected to the bus system and which has means for picking up and evaluating an address allocation message, a memory for storing a subscriber address assigned to the bus subscriber, and means for generating and sending an acknowledgement message which comprises the assigned subscriber address, where the planning data stored in the control unit comprise a link between the physical position of the at least one secure bus subscriber within the bus system and the subscriber address assigned to the bus subscriber.

Preferably, the bus system is in the form of a ring bus system, particularly on the basis of the INTERBUS standard, having a plurality of bus subscribers connected thereto. In a bus system of this kind, the physical position of the secure bus subscriber is preferably defined by the latter's position within the order of the plurality of bus subscribers connected to the bus system.

The secure bus subscriber advantageously has means for sending an error message, the means being designed to send an error message if the memory does not store a valid subscriber address.

Figure 2:
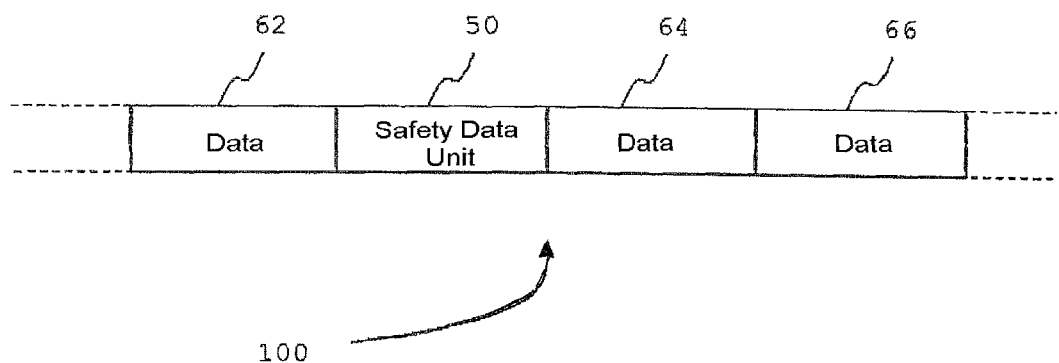
Figure 3:
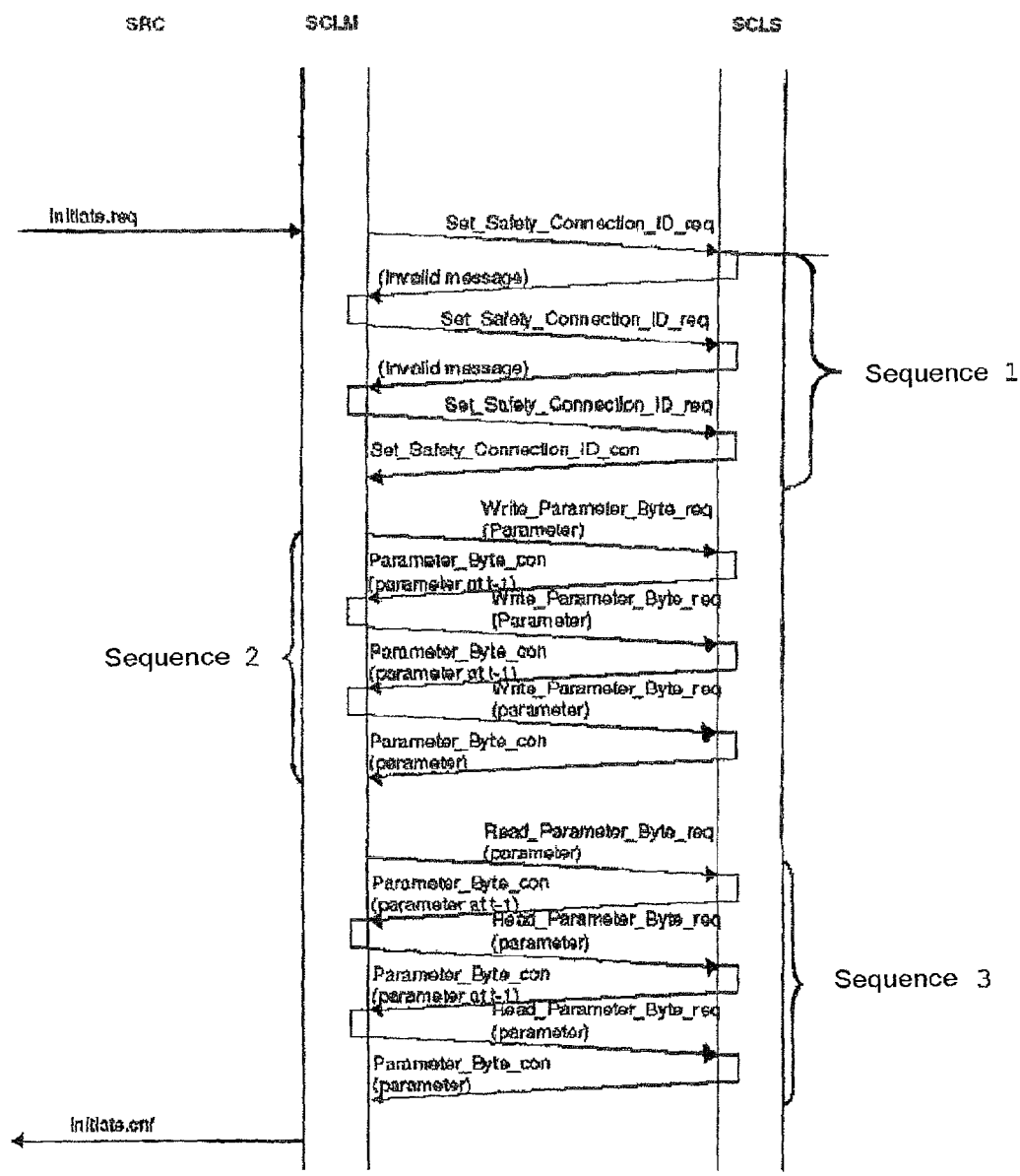

The invention is described more precisely below by way of example using preferred embodiments and with reference to the appended drawings. In the drawings, identical reference symbols denote identical or similar parts and:

FIG. 1: shows a schematic illustration of a process message which contains safety-related data, FIG. 2: schematically shows the sum frame for an INTERBUS bus system, into which sum frame the process message from FIG. 1 has been embedded, FIG. 3: schematically shows an initialization sequence in line with a preferred embodiment of the inventive method.

The inventive method is particularly suitable for all ring-shaped bus systems, the exemplary embodiments described below using the INTERBUS standard.

FIG. 1 shows a process message 50 which contains safety-related data 20 and, together with other data, forms a safety data unit. The other data, provided to increase safety, in this exemplary embodiment comprise the subscriber address 10 referred to as Connection ID, a data unit 30 comprising a sequence number and a time stamp, and a 24-bit CRC checksum 40.

When a bus system based on the INTERBUS standard is used, the data are transmitted within a sum frame 100. In this exemplary embodiment, the sum frame 100 contains other data units 62, 64 and 66, which may also contain non-secure data.

FIG. 3 shows an initialization sequence which comprises three individual sequences. The first sequence is used to transmit the subscriber address or "Connection ID", while the second and third sequences in this embodiment are used to transfer various appliance parameters for the secure bus subscriber.

Parameters are transmitted from the SCLM to the SCLS using a message called "Write_Parameter_Byte_Req". A message called "Read_Parameter_Byte_Req" is used by the SCLM to read a parameter from the SCLS. The SCLS responds to both messages with a message called "Parameter_Byte_con", which mirrors the written parameter or contains the requested parameter. The "Write_Parameter_Byte_req" message with the parameter "Connection ID" has special encoding for the parameter "Connection ID" and a separate message label "Set_Safety_Connection_ID_req". The "Parameter_Byte_con" message from the SCLS for this message, which is used to return the "Connection ID", is called "Set_Safety_Connection_ID_con". In the exemplary embodiment shown in FIG. 3, the "Set_Safety_Connection_ID_req" message is sent to the SCLS up to three times.

What is claimed is:

1. A method for configuring a secure bus subscriber connected to a field bus in a secure control system, the secure bus subscriber being assigned a defined subscriber address, the method comprising:

sending an address allocation message from a control unit connected to the field bus to the secure bus subscriber, the address allocation message comprising the defined subscriber address, wherein the address allocation message is sent on the basis of planning data for the secure bus subscriber connected to the field bus which are stored in the control unit, wherein planning data stored in the control unit comprise a link between a physical position of the secure bus subscriber within a bus system and the subscriber address assigned to the bus subscriber, storing the defined subscriber address in a memory in the secure bus subscriber, sending an acknowledgement message from the secure bus subscriber to the control unit, the acknowledgement message comprising the defined subscriber address, sending a parameter transfer message from the secure bus subscriber to the control unit, and verifying, by the control unit, by means of comparison with parameters transmitted by the secure bus subscriber, the planning data for the secure bus subscriber that are stored in the control unit.

2. The method as claimed in claim 1, further comprising:
activating the communication between the control unit and the secure bus subscriber, the address allocation message being sent after the activation of the communication.

3. The method as claimed in claim 2, wherein activation of the communication is preceded by a connection termination message being sent from the control unit to the secure bus subscriber.

4. The method as claimed in claim 1, wherein the secure bus subscriber sends an error message to the control unit prior to receiving the address allocation message from the control unit.

5. The method as claimed in claim 1, further comprising:
sending a process message
i) from the control unit to the secure bus subscriber, and/or
ii) from the secure bus subscriber to the control unit, the process message comprising at least process data for controlling a process and the defined subscriber address.

6. The method as claimed in claim 1, further comprising:
checking, by the secure bus subscriber or by the control unit, the defined subscriber address which a parameter transfer message or a process message contains.

7. The method as claimed in claim 6, wherein recognition of an erroneous defined subscriber address prompts production of an error signal.

8. The method as claimed in claim 6, wherein recognition of an erroneous defined subscriber address prompts setup of the connections between the control unit and all secure bus subscribers connected to the field bus.

9. The method as claimed in claim 1, wherein the field bus is based on the INTERBUS standard.

10. The method as claimed in claim 1, wherein the control unit is in the form of a bus master for the field bus and/or is connected to a bus master for the field bus.

11. A control system for the secure control of safety-critical processes, the control system comprising:
a bus system,
a control unit connected to the bus system, and
at least one secure bus subscriber connected to the bus system,
wherein the at least one secure bus subscriber has means for picking up and evaluating an address allocation message and also a memory for storing a subscriber address assigned to the bus subscriber, and the control unit stores planning data for the secure bus subscriber connected to the field bus, wherein the planning data stored in the control unit comprise a link between a physical position of the secure bus subscriber within the bus system and the subscriber address assigned to the bus subscriber, wherein the secure bus subscriber has means for sending a parameter transfer message to the control unit, and wherein the control unit has means for verifying, by means of comparison with parameters transmitted by the secure bus subscriber, the planning data for the secure bus subscriber that are stored in the control unit.

12. The control system as claimed in claim 11, wherein the at least one secure bus subscriber has means for sending an error message, the means being designed to send an error message if the memory does not store a valid subscriber address.

13. The control system as claimed in claim 11, wherein the bus system is a ring system.

14. The control system as claimed in claim 11, wherein the bus system is an INTERBUS bus system.

15. A method for configuring a secure bus subscriber connected to a field bus in a secure control system, the secure bus subscriber being assigned a defined subscriber address, the method comprising:

defining the subscriber address within a control unit connected to the field bus on the basis of the physical position of the secure bus subscriber within the field bus, sending an address allocation message from the control unit to the secure bus subscriber, the address allocation message comprising the defined subscriber address, wherein the address allocation message is sent on the basis of planning data for the secure bus subscriber connected to the field bus, wherein the planning data are stored in the control unit, and wherein the planning data stored in the control unit comprise a link between the physical position of the secure bus subscriber within a bus system and the subscriber address assigned to the bus subscriber, storing the defined subscriber address in a memory in the secure bus subscriber, sending an acknowledgement message from the secure bus subscriber to the control unit, the acknowledgement message comprising the defined subscriber address, and sending a parameter transfer message from the secure bus subscriber to the control unit, comprising parameters that include at least one of i) appliance type, ii) manufacturer, and iii) serial number.

16. The method as claimed in claim 15, wherein the defining of the subscriber address comprises storing planning data for the secure bus subscriber connected to the field bus in the control unit, the stored planning data comprising a link between the physical position of the secure bus subscriber within the field bus and the defined subscriber address.

17. The method as claimed in claim 15, wherein the field bus is in the form of a ring bus having a plurality of bus subscribers connected thereto and the physical position of the secure bus subscriber is defined by the latter's position within the order of the plurality of bus subscribers connected to the ring bus.

18. The method as claimed in claim 17, wherein the ring bus is based on the INTERBUS standard.

19. A control system for the secure control of safety-critical processes, the control system comprising:

a bus system, a control unit which is connected to the bus system and which has means for generating and sending an address allocation message on the basis of stored planning data, and at least one secure bus subscriber which is connected to the bus system and which has means for picking up and evaluating an address allocation message, a memory for storing a subscriber address assigned to the bus subscriber, and means for generating and sending an acknowledgement message which comprises the assigned subscriber address, wherein the planning data stored in the control unit comprise a link between the physical position of the at least one secure bus subscriber within the bus system and the subscriber address assigned to the bus subscriber, wherein the secure bus subscriber has means for sending a parameter transfer message to the control unit, and wherein the control unit has means for verifying, by means of comparison with parameters transmitted by the secure bus subscriber, the planning data for the secure bus subscriber that are stored in the control unit.

20. The control system as claimed in claim 19, wherein the bus system is in the form of a ring bus system having a plurality of bus subscribers connected thereto and the physical position of the at least one secure bus subscriber is defined by the latter's position within the order of the plurality of bus subscribers connected to the ring bus system.

* * * * *